United States Patent [19]
Li

[11] Patent Number: 5,338,595
[45] Date of Patent: Aug. 16, 1994

[54] LAUNDERABLE RETROREFLECTIVE APPLIQUE WITH METAL-AZO DYE

[75] Inventor: Wu-Shyong Li, Woodbury, Minn.

[73] Assignee: Minnesota Mining and Manufacturing Company, St. Paul, Minn.

[21] Appl. No.: 954,331

[22] Filed: Sep. 30, 1992

Related U.S. Application Data

[63] Continuation-in-part of Ser. No. 697,653, May 8, 1991, abandoned.

[51] Int. Cl.⁵ .................... G02B 5/128; B32B 25/02
[52] U.S. Cl. .................... 428/143; 428/149; 428/285; 428/325; 428/346; 428/349; 428/343; 428/241; 428/447; 428/521; 428/522; 428/523; 428/442; 428/441; 359/536; 359/538; 359/539; 359/541; 359/540
[58] Field of Search ............ 428/143, 149, 285, 325, 428/346, 349, 343, 241, 447, 521, 522, 523, 442, 441; 359/536, 538, 539, 541, 540

[56] References Cited

U.S. PATENT DOCUMENTS

| | | | |
|---|---|---|---|
| T987,003 | 10/1979 | Johnson et al. | 356/445 |
| 3,700,305 | 10/1972 | Bingham | 350/105 |
| 3,830,682 | 8/1974 | Rowland | 428/161 |
| 4,025,159 | 5/1977 | McGrath | 525/305 |
| 4,076,671 | 2/1978 | Bright | 428/451 |
| 4,082,426 | 4/1978 | Brown | 359/540 |
| 4,153,412 | 5/1979 | Bailey | 359/538 |
| 4,263,345 | 4/1981 | Bingham | 428/260 |
| 4,272,564 | 6/1981 | Grewe et al. | 427/163 |
| 4,356,233 | 10/1982 | Lange et al. | 428/336 |
| 4,533,592 | 8/1985 | Bingham | 428/325 |
| 4,598,020 | 7/1986 | Panush | 428/411.1 |
| 4,630,891 | 12/1986 | Li | 350/105 |
| 4,637,950 | 1/1987 | Bergeson et al. | 428/168 |
| 4,763,985 | 8/1988 | Bingham | 359/518 |
| 4,955,690 | 9/1990 | Bacon, Jr. | 359/540 |
| 5,055,347 | 10/1991 | Bacon, Jr. | 428/325 |

FOREIGN PATENT DOCUMENTS

| | | |
|---|---|---|
| 0175513 | 3/1986 | European Pat. Off. . |
| 0200521 | 5/1986 | European Pat. Off. . |
| 0255251 | 2/1988 | European Pat. Off. . |
| 3001748 | 2/1982 | Fed. Rep. of Germany . |

OTHER PUBLICATIONS

ASTM D2244-79, Standard Method for Instrumental Evaluation of Color Differences of Opaque Materials.

*Primary Examiner*—William Watkins, III
*Attorney, Agent, or Firm*—Gary L. Griswold; Walter N. Kirn; Robert H. Jordan

[57] ABSTRACT

Retroreflective appliques comprising a monolayer of retroreflective elements partially embedded in and protruding from the front surface of a binder layer and an optional layer of adhesive on the rear surface of the binder layer, wherein the binder layer, the adhesive layer, or both contain a metal-azo dye to camouflage the color of any exposed portions of said binder layer. Appliques comprising microspheres with aluminum reflectors as retroreflective elements and a black metal-azo dye in the binder layer will exhibit a pleasing silver appearance even after portions of the binder layer have been visibly exposed due to degradation of the aluminum reflectors, typically as a result of subjecting the applique to harsh laundering conditions.

19 Claims, 1 Drawing Sheet

LAUNDERABLE RETROREFLECTIVE APPLIQUE WITH METAL-AZO DYE

CROSS-REFERENCE TO RELATED APPLICATIONS

This application is a continuation-in-part of application Ser. No. 07/697,653, filed May 8, 1991, presently abandoned.

FIELD OF INVENTION

The present invention relates to novel retroreflective appliques and articles made with such appliques.

BACKGROUND

In order to improve safety of pedestrians, joggers, workers on roadways, etc., retroreflective markings have been attached to clothing. In one common embodiment, retroreflective appliques comprising a monolayer of retroreflective elements, e.g., transparent microspheres with hemispheric reflectors, partially embedded in a layer of binder material, with adhesive backings are bonded to articles of clothing.

A problem with such appliques is that when the garment to which they are applied is laundered, a number of the retroreflective elements may be dislodged, the elements may be degraded, or the binder material may tend to discolor, e.g., turn somewhat yellow or green, resulting in undesirable discoloration of the applique. Typically, the binder layers in such appliques contain pigments such as carbon black, titanium dioxide, or flakes of metallic aluminum. In addition to imparting a desired initial coloration to the applique, these pigments serve to stabilize the color of the applique, masking discoloration of the applique when it is laundered. The pigments are sometimes referred to as a camouflage or camouflaging agent because they hide the discoloration of the binder material. In some cases, pigments provide other desired effects as well, e.g., antimony oxide imparts flame retardant characteristics to binder layers in which it is incorporated.

The loadings of pigments which are necessary to achieve the desired degree of coloration stability and camouflage, e.g., often 1 weight percent or more, may tend to reduce the flexibility of the binder layer, causing the applique to be less flexible and increasing its susceptibility to loss of retroreflective elements when flexed. In some instances, the pigment may alter the characteristics of the binder material so as to interfere with adhesion of the retroreflective elements by the binder layer. During fabrication of the applique, the pigments may settle to the retroreflective element/binder material interface, further interfering with desired adhesion. In some instances, the pigment itself is degraded, e.g., aluminum flakes tend to oxidize, particularly when laundered under high pH conditions, so as to become translucent, reducing the desired camouflaging effect.

As a result, some desired combinations of coloration and durability are not obtained.

The problem is particularly troublesome when the clothing is subjected to industrial laundering, where the conditions of laundering are often more severe than conventional home laundering. For instance, in an industrial laundry, the laundering conditions may include wash temperatures of 40° to 90° C. (105° to 190° F.) and pH of 10 to 12.5, whereas in contrast, typical conditions for home laundering may include temperatures of 4° to 60° C. (400° to 140° F.) and pH of less than 11. Also, home laundering equipment typically subjects the articles being cleaned to less rigorous handling and stress than does industrial laundry equipment.

SUMMARY OF INVENTION

The present invention provides novel retroreflective appliques which can be applied to substrates such as fabrics and garments to impart retroreflective properties thereto. The appliques of the invention provide unexpected durability, particularly in terms of their ability to maintain a uniform appearance (color) when subjected to harsh laundering conditions. Applied to fabric substrates, appliques of the invention exhibit surprising resistance to degradation when the article is laundered and retain a surprising degree of their initial coloration, e.g., the initial silver appearance of an aluminum vapor coat, and retroreflective properties.

In brief summary, retroreflective appliques of the invention comprise a monolayer of retroreflective elements partially embedded in and protruding from the front surface of a binder layer and an optional layer of adhesive, preferably hot melt type, on the rear surface of the binder layer. The adhesive layer is optionally covered with a removable release liner. In some embodiments, the applique is bonded to a substrate, e.g., a piece of fabric or article of clothing, with the adhesive, and in other embodiments the binder layer serves to both secure the retroreflective elements and to bond the applique to a desired substrate. If desired, the applique can be sewn onto a substrate. In an important distinction from previously known retroreflective appliques, the binder layers and/or the adhesive layers of appliques of the invention comprise metal-azo dyes which impart desired coloration and camouflage properties thereto by camouflaging the color of any visibly exposed portions of the binder layer. Portions of the binder layer can become visibly exposed as a result of degradation of the reflective layers of the retroreflective elements. Such degradation can be caused by harsh laundering conditions.

Retroreflective appliques of the invention have been found to exhibit surprising retention of initial coloration and retroreflective brightness, particularly when subjected to industrial laundering conditions. As a result, articles to which appliques of the invention have been applied may be laundered many more times than previously possible while still retaining their desired initial coloration and retroreflective character.

BRIEF DESCRIPTION OF DRAWING

The invention will be further explained with reference to the drawing, wherein.

These figures, which are idealized, are not to scale and are intended to be merely illustrative and non-limiting.

DETAILED DESCRIPTION OF ILLUSTRATIVE EMBODIMENTS

Figure 1:
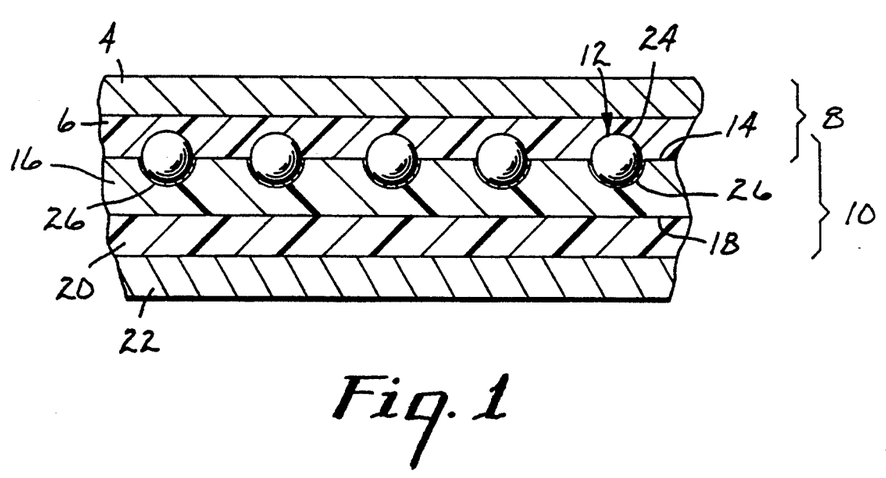
FIG. 1 is cross-sectional illustration of a portion of an illustrative embodiment of a retroreflective applique of the invention.

Reference is made to FIG. 1 wherein is shown an illustrative embodiment of retroreflective applique 10 of the invention. Applique 10 comprises a monolayer of retroreflective elements 12 partially embedded in and protruding from front surface 14 of binder layer 16. Disposed on rear surface 18 of binder layer 16 is optional adhesive layer 20. Applique 10 is shown with optional release liner 22 which covers the exposed surface of adhesive layer 20. To apply applique 10 to a substrate such as a fabric (not shown), release liner 22 is first removed. Applique 10 is also shown on optional temporary carrier 8 comprising paper sheet 4 and polymer lining 6.

Figure 2:
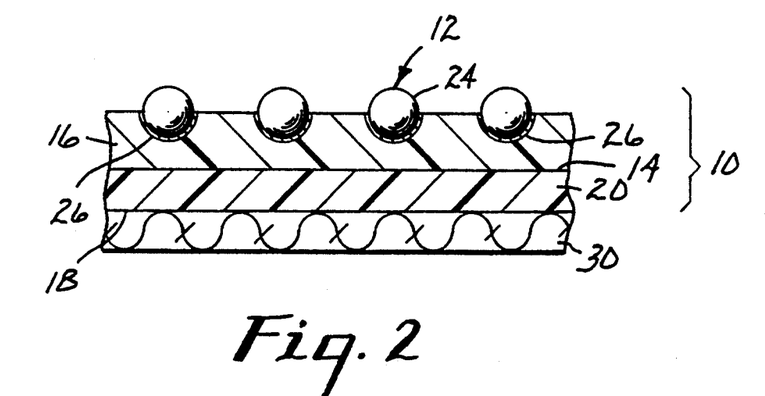
FIG. 2 is cross-sectional illustration of a portion of another illustrative embodiment of a retroreflective applique of the invention bonded to a substrate.

FIG. 2 shows retroreflective applique 10 on substrate 30, e.g., an article of clothing such as a jacket or vest.

In brief summary, a typical method of making appliques of the invention comprises arranging retroreflective elements in desired monolayer arrangement on a temporary carrier with the rear portions of the retroreflective elements presented away from the carrier, forming a binder layer over the rear portions of the retroreflective elements, and applying an optional adhesive layer on the back side of the binder layer.

The most typical form of retroreflective elements 12 will be spherical microspheres 24 having reflectors 26 thereon as shown in FIG. 1. As known to those skilled in the art, one method for assembling a monolayer of such retroreflective elements is to cascade microspheres onto temporary carrier 8 which secures microspheres 24 in desired arrangement temporarily. For instance, microspheres 24 can be partially embedded in heat softenable polymer layer 6 on paper sheet 4. Some examples of useful polymer coatings include polyvinyl chloride, polysulfones, polyalkylenes such as polyethylene, polypropylene, and polybutylene, polyesters such as polyethylene terephthalate, and the like. Upon cooling, polymer layer 6 retains microspheres 24 in desired arrangement. Depending in part upon the characteristics of carrier 8 and elements 12, it may be desired to condition carrier 8 and/or elements 12 to achieve desired release properties. For instance, selected release agents or adhesion promoters may be used.

Microspheres 24 are typically preferably packed as closely as possible, ideally in their closest hexagonal arrangement, to achieve greater retroreflective brightness and may be so arranged by any convenient transfer process, such as printing, screening, cascading, or with a hot can roll.

The most typical kind of retroreflective elements are transparent microspheres having reflectors on the rear surfaces thereof as shown in FIG. 1. Such retroreflective elements typically provide satisfactory levels of retroreflective brightness over a wide range of incidence angles, i.e., the angles at which the light strikes the sheeting, a property sometimes referred to as "angularity".

If transparent microspheres are used, the microspheres are preferably substantially spherical in shape in order to provide the most uniform and efficient retroreflection. Furthermore, the microspheres are preferably substantially transparent so as to minimize the amount of light absorbed by the microspheres and thereby optimize the amount of light which is retroreflected by sheetings of the invention. The microspheres are typically substantially colorless, but, may be colored to produce special effects if desired.

Microspheres used herein may be made from glass or synthetic resin having the optical properties and physical characteristics taught herein. Glass microspheres are typically preferred because they typically cost less, are harder, and exhibit superior durability to microspheres made of synthetic resins.

Microspheres used in the present invention will typically have an average diameter of between about 30 and about 200 microns. Microspheres which are smaller than this range may tend to provide lower levels of retroreflection because of diffraction effects, whereas microspheres larger than this range may tend to impart undesirably rough texture to the transfer or undesirably reduce the flexibility thereof. Microspheres used in the present invention will typically have a refractive index of between about 1.7 and about 2.0, the range typically considered to be useful in microsphere-based retroreflective products where, as here, the front surfaces of the microspheres are exposed or air-incident.

As mentioned above, microsphere-based retroreflective elements of retroreflective transfers of the invention have reflectors on the rear surfaces thereof. Typically, such reflectors are applied to the rear surfaces of the microspheres after the microspheres have been partially embedded in the carrier, thereby facilitating the arrangement of the microspheres in substantially uniform direction for retroreflection. Furthermore, as is known, the size of reflectors, i.e., how much of the surface of the microspheres which is covered, may be controlled in part by controlling the depth into the carrier to which the microspheres are embedded prior to application of the reflectors thereto.

Among the variety of materials which may be used as reflectors are vacuum-deposited or vapor-coated metal coatings, such as aluminum or silver; chemically-deposited metal coatings, such as silver; metal-coated plastic films; metal flakes; such as aluminum or silver; and dielectric coatings. Aluminum or silver coatings are typically preferred, because they tend to provide the highest retroreflective brightness. The reflective color of silver coatings is typically preferred to that of aluminum coatings, but an aluminum vapor coat is normally more preferred, because silver reflective coatings typically suffer more severe degradation in outdoor exposure than do aluminum coatings. U.S. Pat. No. 3,700,305 (Bingham) discloses dielectric mirrors or coatings that may be used as reflectors in retroreflective articles of the invention.

An advantage of dielectric reflectors is that appliques made with microspheres having such reflectors may be easily made in a variety of bright colors. Such reflectors are typically subject to degradation under laundering conditions, particularly industrial laundering conditions, and are accordingly used on articles destined only for home laundering. Aluminum and silver reflectors are generally less expensive than dielectric reflectors and typically exhibit substantially greater durability under industrial laundering conditions, although partially degraded (oxidized) aluminum reflectors typically impart a dull gray color to the applique rather than imparting the initial silver color of the aluminum reflectors.

Following arrangement of retroreflective elements 12, a binder composition that forms binder layer 16 is applied thereover. Binder layer 16 is typically between about 50 and about 250 microns (2 and 10 mils) thick over the embedded portion of retroreflective elements 12, with thicknesses of between about 75 and about 100 microns (3 and 4 mils) typically being preferred. It will be understood that binder layers having thicknesses outside these ranges may be used. However, if binder layer 16 is too thin, it will not provide sufficient support to retroreflective elements 12 which will be readily dislodged, whereas increasing the thickness of binder layer 16 leads to increased cost for applique 10 as greater amounts of the binder material are required. Also, the flexibility of applique 10 typically tends to decrease as the thickness is increased.

The binder composition comprises binder material, e.g., e-beam cured polymeric materials; one or two component urethanes; nitrile rubber; acrylics; polyesters; epoxy; thermoplastic elastomers; vinyls such as polyvinyl chloride, polyvinylacetate, and their copolymers; etc., and one or more metal-azo dyes.

The binder composition may further comprise one or more optional components, including crosslinkers, coupling agents, and stabilizers (e.g., thermal stabilizers and antioxidants such as hindered phenols and light stabilizers such as hindered amines or ultraviolet stabilizers), flame retardants, and flow modifiers (e.g., surfactants such as fluoropolymers or silicones).

In one preferred embodiment, the binder composition is an e-beam cured polymeric material as appliques made with certain e-beam cured polymeric materials typically provide superior performance as compared to those made with other binder materials. One useful example of such desirable e-beam curable binder materials is the HYPALON TM series of polymers, a series of chlorosulphonated polyethylenes from E. I. du Pont de Nemours & Company ("du Pont"). Such materials are highly flexible, and have been found to be resistant to degradation by exposure to ozone, oxygen, weathering, oil, and many chemicals as well as harsh laundering conditions. Illustrative examples of other desirable e-beam curable binder materials that can be used include ethylene copolymers comprising at least about 70% by weight of polyethylene such as ethylene/vinyl acetate, ethylene/acrylate, and ethylene/acrylic acid, and poly-(ethylene-co-propylene-co-diene) ("EPDM") polymers.

Another preferred binder material is crosslinked polyester. Illustrative examples of such materials include the VITEL TM Copolyester series from Goodyear Tire & Rubber Co. and BOSTIK TM Polyester Resin from Emhart Corp.

The binder composition contains between about 0.01 and about 2.0 weight percent, preferably between about 0.1 and about 0.5 weight percent, of metal-azo dye. The metal-azo dye component may be a single metalazo dye or a combination of more than one metal-azo dye of selected color. Metal-azo dye is preferred because it provides the most effective camouflage of the color of any exposed portions of the binder material. It is understood that portions of the binder material can become exposed upon degradation of the reflectors. Since binder materials often have a color which is not aesthetically pleasing, it is typically desirable to camouflage the color of the binder material. Since appliques of the invention are intended to be secured to launderable substrates, it is critically important that they comprise dyes which are resistant to degradation or leaching out during laundering. Appliques comprising microspheres with aluminum reflectors as retroreflective elements and a black metal-azo dye in the binder layer in accordance with the invention will exhibit a pleasing silver appearance even after portions of the binder layer have been visibly exposed due to degradation of the aluminum reflectors, typically as a result of subjecting the applique to harsh laundering conditions.

The metal-azo dyes used herein are soluble in organic solvents such as methyl ethyl ketone, toluene, xylene, ethyl acetate, cyclohexanone, etc.; thus providing a potential processing advantage when incorporating them into binder compositions in accordance with the invention. In distinction, pigments, the conventionally used colorant in retroreflective appliques, are insoluble in such solvents.

Metal-azo dyes for use in appliques of the invention are believed to be resistant to degradation or leaching out during laundering for a variety of reasons. For instance, ionic dyes with relatively high degrees of hydrophilicity tend to be subject to undue degradation and/or leaching during laundering. Dyes which are used in thermal dye transfer processes wherein they must undergo diffusion and/or sublimation under room temperature or moderately elevated temperatures would typically be expected to not be sufficiently resistant to leaching out of the binder layer during laundering. In general, metal-azo dyes having molecular weights above about 300 will be suitable for use herein. Dyes having polar functionalities and those with amino- and hydroxyl- derivative functional groups generally exhibit improved laundering performance as compared to otherwise similar dyes lacking those or similar groups. Dyes with functional groups that would anchor to the binder material would exhibit greater resistance to diffusion out of the binder layer.

Metal-azo dyes, which are based on heavy metal complexes, exhibit great stability in binder layers of launderable appliques and thus are preferred. Illustrative examples of metal-azo dyes which are useful herein include: chromium-azo dyes, such as ZAPON TM X50 or X51 (black), ZAPON TM Yellow 156 and 157, ZAPON TM Red 335 and 471, ZAPON TM Violet 506, ORASOL TM CN and RL (black) and ORASOL TM Red B and Red G from Ciba-Geigy.

The following dyes are also believed to be resistant to degradation or leaching out during laundering, but are not believed to be as effective as metal-azo dyes: anthroquinone dyes, e.g., PEROX TM Yellow GS, PEROX TM Magenta 36, PEROX TM Red LB, and MORTON TM Violet 14 from Morton Thiokol, ATLASOL TM Cerise NA from Atlantic Company, WAXOLINE TM Blue APFW from ICI, and NITROFAST TM Blue 2B from Sandoz; aminoketone dyes, e.g., HOSTASOL TM Yellow 3G from Hoechst Celanese; quinophthalone dyes, e.g., MACROLEX TM Yellow G from Bayer and THERMOPLAST TM Yellow 154 from BASF; pyrazolone dyes, e.g., MACROLEX TM Yellow 3G from Bayer and THERMOPLAST TM Yellow 104 from BASF; and phthalocyanine dyes, e.g., ZAPON TM Blue 806 and 807 and ORASOL TM Blue GN and BLN from BASF.

As mentioned above, the binder composition may further comprise one or more crosslinkers. Selection of crosslinker and its amount will be dependent in part upon the elastomer which is used.

Illustrative examples of crosslinkers which may be used with e-beam curable elastomers include multifunctional monomers and oligomers such as trimethylolpropane trimethacrylate, pentaerythritol triacrylate, and triallyl-1,3,5-triazine-2,4,6(1H,3H,5H)trione. Illustrative examples of other useful crosslinkers include 1,6-hexanediol diacrylate, tetraethylene glycol diacrylate, neopentylglycol diacrylate, tripropylene glycol diacrylate, trimethylolpropane ethoxy triacrylate, tris(2-hydroxethyl) isocyanurate triacrylate, dipentaerythritol pentaacrylate, urethane acrylate oligomers (e.g., CN970 series from Sartomer Co. and EBERCRYL TM from Radcure Specialties, Inc.), epoxy acrylate oligomers, and acrylic oligomers. Crosslinkers may be used alone or in combination of one or more. Typically, the binder layer will contain up to about 10 weight percent, and preferably between about 0.5 and about 2 weight percent, of such crosslinker. If too much crosslinker is used, the resultant binder layer may tend to be insufficiently flexible. Also, because many crosslinkers tend to be susceptible to degradation due to water and high pH, binder layers made with excessive amounts may tend to suffer impaired launderability. If too little crosslinker is used, the resultant binder layer may not be cured sufficiently and thus be subject to degradation, e.g., swelling and retroreflective element loss, under laundering conditions, or require high e-beam dosage to achieve sufficient cure.

Typically, binder layer 16 will comprise one or more coupling agents, e.g., silane coupling agent, to promote adhesion of binder layer 16 to retroreflective elements 12. Selection of a coupling agent will be based in part upon the particular elastomer, crosslinker (if any), and retroreflective elements which are used. Illustrative examples of coupling agents include vinyltrimethoxysilane, vinyltriethoxysilane, gamma-methacryloxypropyl-tris-(2-methoxyethoxy)silane, gamma-methacryloxypropyltrimethoxysilane, beta-(3,4-epoxycyclohexy)ethyltrimethoxysilane, gamma-glycidoxypropyltrimethoxysilane, gamma-mercaptopropyltriethoxysilane, gamma-mercaptopropyltrimethoxysilane, gamma-aminopropyltriethoxysilane, and N-beta-(aminoethyl)-gamma-aminopropyltrimethoxysilane. These may be used singly or in combination. It will be understood that selection of coupling agent(s), if used, will be dependent in part upon the binder material and retroreflective elements used. To minimize fading of aluminum reflector layers, it is typically preferred that amino-containing silane coupling agents be avoided. If the binder material is a two part urethane or a isocyanate cured polyester, epoxy or methacryloxy functional silane coupling agents are preferably used and silane coupling agents containing active hydrogen moieties are preferably avoided. Gamma-glycidoxypropyltrimethoxysilane, gamma-mercaptopropyltrimethoxysilane, and gamma-methacryloxypropyltrimethoxysilane have been found to exhibit the best performance with chlorosulphonated polyethylenes among those listed and are preferred.

The coupling agent may be applied, e.g., by spraying or coating, to the surfaces of the retroreflective elements or to the binder layer prior to its application to the elements or may be incorporated directly into the binder composition. Application to the elements provides the advantage of using lesser quantities of coupling agent, which in some instances is relatively expensive, whereas incorporation into the binder composition provides the advantage of eliminating a separate application process during fabrication of the retroreflective applique.

Typically, binder layer 16 will contain up to about 10 weight percent, and preferably between about 0.1 and about 7 weight percent, of coupling agent. If too little coupling agent is used, the resultant applique may, depending upon the characteristics of the elastomer, tend to suffer undesirable loss of retroreflective elements. If too much coupling agent is used, it may in some instances impair the physical properties of the binder layer, e.g., mercapto-based agents may cause the binder to swell. Also, the coupling agents are typically relatively expensive as compared to the other components of the appliques.

In another embodiment of the invention, the metal-azo dye can be provided in adhesive layer 20 of applique 10. In this embodiment, metal-azo dye can be provided in binder layer 16 or not included in binder layer 16 at all. The metal-azo dye in adhesive layer 20 serves to camouflage the color of any visibly exposed portions of binder layer 16, i.e., portions of binder layer 16 that have been visibly exposed due to degradation of reflectors 26 of applique 10.

It is believed that retroreflective appliques of the invention comprising a metal-azo dye in the binder layer, adhesive layer, or both exhibit suprising retention of initial coloration and retroreflective brightness irrespective of what type of binder or adhesive material is used.

EXAMPLES

The invention will be further explained by the following illustrative examples which are intended to be non-limiting. Unless otherwise indicated, all amounts are expressed in parts by weight.

Unless otherwise indicated, the following test methods were used.

Retroreflective Brightness

Retroreflective brightness was measured using a retroluminometer as described in U.S. defensive publication T987,003 at divergence angles of about 0.2° and entrances angles of about −4°.

Laundering

Launderability of appliques was evaluated by washing a piece of fabric to which the subject applique had been applied for the indicated number of cycles in a Milnor System 7 Washing Machine Model 30015M4G from Pellerin Minor Corp. using program no. 5 for medium soiled, colored fabric with the indicated detergent. Each cycle is about 40 minutes in length. The washer was loaded with about 5.5 to 6.8 kilograms (12 to 15 pounds) (dry) of laundry and used about 68 liters (18 gallons) of water at the indicated temperature.

The cleaning agent used was 30 grams of FACTOR TM detergent, a detergent from Fabrilife Chemicals, Inc. containing tetrasodium pyrophosphate, nonylphenoxypoly(ethyleneoxy)ethanol, sodium carbonate, and silica. In some cases, the detergent further included 60 grams of ULTRASIL TM, a pH builder from Pennwalt Corp. believed to contain 40 weight percent NaOH and 60 weight percent sodium metasilicates.

CIE Color Shift

The CIE Color shift, referred to herein as Delta E, was determined using the CIE tristimulus color coordinates, i.e., L, a, and b, as measured with a Minolta Chroma Meter C-121. Delta E was calculated as the square root of the sum of the squares of the changes on each of the coordinate axes in accordance with ASTM D2244-79.

EXAMPLE 1

Glass microspheres having an average diameter of about 40 to 90 microns were partially embedded in a temporary carrier sheet and aluminum specular reflective layers applied to the exposed portions of the microspheres to yield retroreflective elements.

A binder composition comprising

| Amount | Component |
|---|---|
| 35 | Binder Material - 40 weight percent solids solution in methyl ethyl ketone of polyol based on polytetramethylene oxide having hydroxy equivalent weight of 3000; |
| 2.23 | Binder Material - 40 weight percent solids solution in methyl ethyl ketone of DESMODUR ™ N-100, an aliphatic polyisocyanate adduct based on hexamethylene diisocyanate from Mobay Corp.; |
| 0.12 | Catalyst - 10 weight percent solution in methyl isobutyl ketone of dibutyl tin dilaurate; and |
| 1.49 | Dye - 10 weight percent solution in methyl isobutyl ketone of ZAPON ™ X-51, a black chromium-azo dye; | was coated over the retroreflective elements to a wet thickness of about 250 microns (10 mils). The applique was then wet laminated to a PRIMALUX ™ fabric (an 80/20 blend of polyester and combed cotton, weight 3 ounces/yard$^2$) from Springs Industries, Inc., and the laminate dried at 66° C. (150° F.) for 5 minutes then at 82° C. (180° F.) for 10 minutes. The temporary carrier was then stripped from the front of the applique to reveal the silver colored retroreflective surface.

Example 2 and Comparative Example A

In Comparative Example A, an array of retroreflective elements on a temporary carrier was prepared as in Example 1.

A binder composition comprising

| Amount | Component |
|---|---|
| 82.8 | Binder Material - 33 weight percent solution in methyl ethyl ketone of HYPALON ™ 20; |
| 1.8 | Coupling Agent - A-189, a gamma-mercaptopropyltrimethoxysilane from Union Carbide Corp.; |
| 0.4 | Crosslinker - trimethylolpropane trimethacrylate having molecular weight of 338 from Aldrich Chemical Co.; and |
| 0.2 | Pigment - 55 weight percent solution in methyl ethyl ketone of MICROLITH ™ Black C-T, a carbon black pigment predispersed in modified rosin ester resin from Ciba-Geigy Corp., | was coated over the retroreflective elements to a wet thickness of about 300 microns (12 mils) and dried at 66° C. (150° F.) for 30 minutes. The dried film was then e-beam irradiated to an exposure of 3 Mrads at 200 kilovolts to yield the binder layer. An Mrad is a megarad where a tad or "radiation absorbed dose" is equal to 100 ergs/gram.

An adhesive composition comprising 100 parts of a 40 weight percent solids solution in methyl ethyl ketone of a polyol having a hydroxy equivalent weight of 3000 and 8.8 parts of MONDUR ™ CB75, a 75 weight percent solids solution in ethyl acetate of an aromatic polyisocyanate adduct based on toluene diisocyanate, from Mobay Corp. was coated over the binder layer to a wet thickness of about 200 microns (8 mils) as an adhesive layer.

The applique was then wet laminated to a fabric as in Example 1. The temporary carrier was then stripped from the front of the applique to reveal the silver colored retroreflective surface.

In Example 2, a monolayer of retroreflective elements was prepared as in Example 1.

A binder composition comprising

| Amount | Component |
|---|---|
| 100 | Binder Material and Dye - solution in methyl ethyl ketone of 35 weight percent HYPALON ™ 20 and 0.046 weight percent ZAPON ™ X-50; |
| 2.1 | Coupling Agent - A-189; and |
| 0.2 | Crosslinker - trimethylolpropane trimethacrylate having weight average molecular weight of 338 from Aldrich Chemical Co.; | was coated over the retroreflective elements to a wet thickness of about 300 microns (12 mils) and dried at 66° C. (150° F.) for 30 minutes. The dried film was then e-beam irradiated to an exposure of 3 Mrads at 200 kilovolts to yield the binder layer.

An adhesive composition like that in Comparative Example A was then applied over the binder layer. The applique was then wet laminated to a polyester fabric (S-551-060, 3.11 ounce/yd$^2$ from Milliken & Co.). The temporary carrier was then stripped from the front of the applique to reveal the silver colored retroreflective surface.

The appliques were then evaluated by washing for the indicated number of cycles at a water temperature of about 77° C. (170° F.) using FACTOR ™ and ULTRASIL ™ cleansers. The initial retroreflective brightness of the applique in Example 2 was about 597 candela per square meter per lux and that of the applique in Comparative Example A was about 603 candela per square meter per lux. The retroreflective brightness retention results obtained are shown in Table I.

TABLE I

| | Brightness[2] | |
|---|---|---|
| Cycles[1] | Ex. 2 | Comp. Ex. A |
| | 100 | 100 |
| 5 | 70 | 70 |
| 10 | 40 | 43 |
| 15 | 24 | 10 |
| 20 | 15 | TD[3] |

[1]Number of wash cycles completed.
[2]Percentage of its initial brightness that indicated sample retained after indicated number of wash cycles.
[3]Test Discontinued because brightness had declined so severely.

After 15 laundering cycles, the applique in Comparative Example A had become yellowish gray with a Delta E of 8.6, whereas after 20 laundering cycles the applique in Example 2 was blue gray, substantially retaining its initial appearance with a Delta E of 3.6.

It is believed that a smaller Delta E can be attributed to 2 mechanisms: (1) higher brightness retention (less degradation of the reflector layer of the applique) and (2) an enhanced camouflaging effect of the colorant (greater absorption of light). In this case, after 20 and 15 laundering cycles, respectively, the applique of Example 2 had a slightly higher brightness retention than the applique of Comparative Example A. However, it is further believed that the second mechanism discussed above has a much more significant effect on Delta E than the first mechanism.

Example 3 and Comparative Examples B and C

In Example 3, an array of retroreflective elements on a temporary carrier was prepared as in Example 1.

A binder composition comprising

| Amount | Component |
|---|---|
| 100 | Binder Material - 32.5 weight percent solution in methyl isobutyl ketone of thermosetting phenolic resin (formaldehyde phenol condensate), nitrile rubber, and plasticizer (dioctyl phthalate) in 5:3.3:1 weight ratio; |
| 1.8 | Coupling Agent - A-189; |
| 0.042 | Dye - ZAPON TM Black X-50; | was coated over the retroreflective elements to a wet thickness of about 250 microns (10 mils) and dried at 66° C. (150° F.) for 10 minutes and then at 93° C. (200° F.) for 5 minutes to yield the binder layer.

An adhesive like that used in Example 2 was coated over the binder layer to a wet thickness of about 250 microns (10 mils).

The applique was then wet laminated to a fabric as in Example 1. The temporary carrier was then stripped from the front of the applique to reveal the silver colored retroreflective surface.

In Comparative Example B, a retroreflective applique was made and applied to a fabric in a similar manner as in Example 3 except the dye was replaced with about 0.5 parts carbon black and about 2.0 parts titanium dioxide pigment provided in the binder layer. In Comparative Example C, a retroreflective applique was made and applied to a fabric in a similar manner as in Example 3 except no colorant and no coupling agent were used. In both Comparative Examples B and C, similar but different adhesives and fabrics were used. It is believed that the use of different adhesives and fabrics had at most a minimal effect on the retained brightness and color of the tested appliques.

The appliques were evaluated by washing for 25 cycles at a water temperature of about 66° C. (150° F.) using FACTOR TM and ULTRASIL TM cleaners. The laundering results obtained are shown in Table II.

TABLE II

| Sample | Brightness[1] | Color Shift[2] | Color |
|---|---|---|---|
| 3 | 29 | 9.5 | Bluish-gray |
| B | 2 | 12.5 | Greenish |
| C | <2 | 33.8 | Yellowish/Brownish |

[1] Percentage of its initial brightness retained after 25 washings.
[2] Delta E between sample after 0 and 25 washings.

Example 4 and Comparative Example D

In Example 4, an array of retroreflective elements on a temporary carrier was prepared as in Example 1.

A binder composition comprising

| Amount | Component |
|---|---|
| 100 | Binder Material - 50 weight percent solids solution in methyl ethyl ketone/toluene mixture (1:1 weight ratio) of VITEL TM VPE-5545, a linear saturated polyester from Goodyear; |
| 2.4 | Binder Material - MONDUR TM CB-75; |
| 0.15 | Catalyst - dibutyl tin dilaurate; |
| 0.05 | Dye - 10 weight percent solution in methyl isobutyl ketone of ZAPON TM X-51; and |
| 1.5 | Coupling Agent - Silane Z-6040, a gamma-glycidoxypropyltrimethoxysilane from Dow Corning Corp.; | was coated over the retroreflective elements to a wet thickness of about 200 microns (8 mils). The construction was then dried by passing on a conveyer through a series of four ovens with the following temperatures and residence times: 66° C. (150° F.) for 1.5 minutes, 77° C. (170° F.) for 1.5 minutes, 77° C. (170° F.) for 1.5 minutes, and then 93° C. (200° F.) for 3 minutes, to yield the binder layer.

An additional layer of the same composition was coated over the binder layer to a wet thickness of about 250 microns (10 mils). This additional layer served as the adhesive layer.

The applique was then wet laminated to a fabric as in Example 2, except the applique was dried on the fabric at 66° C. (150° F.) for 3 minutes and then at 93° C. (200° F.) for 3 minutes. The temporary carrier was then stripped from the front of the applique to reveal the silver colored retroreflective surface.

In Comparative Example D, a retroreflective applique was made with a binder layer of the same composition as in Example 4 except the dye was omitted. The binder layer was applied with a single coating of 175 microns (7 mils) wet thickness and dried and cured at 66° C. (150° F.) for 2 minutes and 93° C. (200° F.) for 5 minutes to yield the binder layer.

An additional layer of the same composition was coated over the binder layer to a wet thickness of about 175 microns (7 mils) for the purpose of serving as the adhesive layer.

The resultant applique was then wet laminated to a polyester fabric (S-551-060, 3.11 ounce/yard² from Milliken and Co.) and the construction dried and cured at 66° C. (150° F.) for 2 minutes and 93° C. (200° F.) for 5 minutes. The temporary carrier was then removed to reveal the silver colored retroreflective surface.

The appliques were then evaluated by washing for the indicated number of cycles at a water temperature of about 74° C. (165° F.) using FACTOR TM and ULTRASIL TM detergents. The retroreflective brightness results obtained are shown in Table III.

TABLE III

| | Brightness[2] | |
|---|---|---|
| Cycles[1] | Ex. 4 | Comp. Ex. D |
| 0 | 100 | 100 |
| 5 | 74 | 60 |
| 10 | 52 | 32 |
| 15 | 28 | 25 |
| 20 | 18 | 22 |

[1] Number of wash cycles completed.
[2] Percentage of its initial brightness that indicated sample retained after indicated number of wash cycles.

The initial brightness of the applique in Example 4 was 658 candela per square meter per lux and that of the applique in Comparative Example D was 578 candela per square meter per lux. After 20 laundering cycles, the applique in Example 4 was dark grayish silver in color, having undergone a Delta E of 17.7 and the applique in Comparative Example D was grayish white, having undergone a Delta E of 31.7. Thus, even though the retained brightness of the applique of Example 4 was lower after 20 cycles, the camouflaging effect of its dye was great enough to result in a much smaller Delta E.

Example 5

An array of retroreflective elements on a temporary carrier was prepared as in Example 1.

A binder composition comprising

| Amount | Component |
|---|---|
| 350 | Binder Material - 50 weight percent solids solution in methyl ethyl ketone/toluene mixture (1:1 weight ratio) of VITEL TM VPE-5545; |
| 8.4 | Binder Material - MONDUR TM CB-75; |
| 0.53 | Catalyst - dibutyl tin dilaurate; |
| 0.18 | Dye - 10 weight percent solution in methyl isobutyl ketone of ZAPON TM X-51; and |
| 5.4 | Coupling Agent - Silane Z-6040; | was coated over the retroreflective elements to a wet thickness of about 175 microns (7 mils). The construction was then dried by passing on a conveyer through a series of four ovens with the following temperatures and residence times: 66° C. (150° F.) for 1 minute, 77° C. (170° F.) for 1 minutes, 88° C. (190° F.) for 1 minute, and then 93° C. (200° F.) for 4 minutes to yield the binder layer.

An additional layer of the same composition with the dye and coupling agent omitted was coated over the binder layer to a wet thickness of about 175 microns (7 mils) for the purpose of serving as an adhesive layer. The applique was then wet laminated to an S-551-060 polyester fabric and the construction dried and cured on a conveyer through ovens at 66° C. (150° F.) for 1 minute, 82° C. (180° F.) for 1 minute, and 93° C. (200° F.) for 5 minutes. The temporary carrier was then stripped from the front of the applique to reveal the silver colored retroreflective surface.

After conditioning the sample by maintaining it at a temperature of 66° C. (150° F.) for 7 days, the applique was evaluated by washing for the indicated number of cycles at a water temperature of about 78° C. (173° F.) using FACTOR TM and ULTRASIL TM cleaners. The applique had an initial retroreflective brightness of about 605 candela per square meter per lux and a retained retroreflective brightness as shown in Table IV.

TABLE IV

| Cycles[1] | Brightness[2] |
|---|---|
| 0 | 100 |
| 10 | 80 |
| 20 | 59 |
| 30 | 48 |
| 40 | 40 |
| 50 | 38 |

[1]Number of wash cycles completed.
[2]Percentage of its initial brightness that sample retained after indicated number of wash cycles.

After 50 laundering cycles, the applique was grayish silver in color, exhibiting a Delta E of less than about 5.

Example 6 and Comparative Example E

In Example 6, a silver colored retroreflective applique was prepared as in Example 5, except the oven temperatures and residence times were as follows: 71° C. (160° F.) for 1 minute, 82° C. (180° F.) for 1 minute, 88° C. (190° F.) for 1 minute, and then 110° C. (230° F.) for 4 minutes.

In Comparative Example E, a retroreflective applique was prepared as in Example 6, except the dye in the binder composition was replaced with 1.5 parts SILBERLINE STAMFORD TM NGH Aluminum Paste, a non-leafing, 62 to 74 weight percent solids in aromatic solvent aluminum paste from Silberline Manufacturing Co., Inc.

The initial retroreflective brightnesses of the appliques were 605 and 593 candela per square meter per lux, respectively. The appliques were then evaluated for corrosion of the aluminum specular reflective layer by immersing in a 1 weight percent solution of HAMIX TM Detergent, a high pH detergent from Leverindus Nykoping, Sweden, in deionized water at 82° C. (180° F.) for the indicated time. The results obtained are shown in Table V below.

TABLE V

| Example | Time[1] | Brightness[2] | Color Shift[3] |
|---|---|---|---|
| 6 | 0 | 100 | 0 |
|   | 2 | 42 | 2.7 |
|   | 7 | <2 | 5.0 |
|   | 17 | <2 | 9.8 |
| E | 0 | 100 | 0 |
|   | 2 | 11 | 8.6 |
|   | 7 | <2 | 20.5 |
|   | 17 | <2 | 35.7 |

[1]Immersion time in hours.
[2]Percentage of original brightness that sample retained after indicated time of immersion.
[3]Delta E between sample's original appearance and appearance after indicated time of immersion.

It is believed that the above immersion test nearly completely destroyed the reflector layer and the aluminum paste of the applique of Comparative Example E. This is believed to explain the large Delta E of Comparative Example E.

Various modifications and alterations of this invention will become apparent to those skilled in the art without departing from the scope and spirit of this invention.

What is claimed is:

1. A retroreflective applique comprising a monolayer of retroreflective elements partially embedded in and protruding from the front surface of a binder layer wherein said binder layer contains between about 0.01 and about 2.0 weight percent of a black chromium-azo dye to camouflage the color of any exposed portions of said binder layer.

2. The applique of claim 1 wherein said binder layer comprises between about 0.1 and about 0.5 weight percent of said dye.

3. The applique of claim 1 wherein said binder layer comprises a binder material selected from the group consisting of: e-beam curable polymers; one component urethanes; two component urethanes; nitrile rubbers; acrylics; polyesters; and thermoplastic elastomers.

4. The applique of claim 1 wherein said binder layer comprises an e-beam curable polymer selected from the group consisting of: chlorosulphonated polyethylenes, ethylene copolymers comprising at least about 70% by weight of polyethylene, and EPDM polymers.

5. The applique of claim 1 wherein said binder layer further comprises an additive selected from the group consisting of crosslinkers, coupling agents, stabilizers, flame retardants, and flow modifiers.

6. The applique of claim 5 wherein said binder layer comprises a crosslinker selected from the group consisting of trimethylolpropane trimethacrylate, pentaerythritol triacrylate, triallyl-1,3,5-triazine-2,4,6(1H,3H,5H) trione, 1,6-hexanediol diacrylate, tetraethylene glycol diacrylate, neopentylglycol diacrylate, tripropylene glycol diacrylate, trimethylolpropane ethoxy triacrylate, tris(20hydroxethyl) isocyanurate triacrylate, dipentaerythritol pentaacrylate, urethane acrylate oligomer, epoxy acrylate oligomer, and acrylic oligomer.

7. The applique of claim 5 wherein said binder layer comprises a coupling agent selected from the group consisting of vinyltrimethoxysilane, vinyltriethoxysilane, gamma-methacryloxypropyl-tris-(2-methoxyethoxy)silane, gamma-methacryloxypropyltrimethoxysilane, beta-(3,4-epoxycyclohexy)ethyltrimethoxysilane, gamma-glycidoxypropyltrimethoxysilane, gamma-mercaptopropyltriethoxysilane, gamma-mercaptopropyltrimethoxysilane, and N-beta-(aminoethyl)-gamma-aminopropyltrimethoxysilane.

8. The applique of claim 1 further comprising a layer of adhesive on the rear surface of said binder layer to secure said applique to a launderable substrate.

9. The applique of claim 8 wherein said adhesive is a hot melt adhesive.

10. The applique of claim 1 wherein said retroreflective elements comprise microspheres with hemispheric reflectors thereon.

11. The applique of claim 10 wherein said reflectors comprise vapor-coated aluminum.

12. The applique of claim 1 wherein said applique is sewn to a launderable substrate.

13. The applique of claim 12 wherein said substrate is a fabric.

14. The applique of claim 12 wherein said substrate is an article of clothing.

15. The applique of claim 1 wherein said dye has a molecular weight above about 300.

16. A retroreflective applique comprising a monolayer of retroreflective elements partially embedded in and protruding from the front surface of a binder layer and an adhesive layer on the rear surface of said binder layer, said adhesive layer and said binder layer both comprising between about 0.01 and about 2.0 weight percent of a black chromium-azo dye to camouflage the color of any exposed portions of said binder layer, said adhesive layer being adapted for use in securing said applique to a launderable substrate.

17. The applique of claim 16 wherein said adhesive layer comprises between about 0.1 and about 0.5 weight percent of said dye.

18. The applique of claim 16 wherein said adhesive layer comprises a hot melt adhesive.

19. The applique of claim 16 wherein said dye has a molecular weight above about 300.

* * * * *

UNITED STATES PATENT AND TRADEMARK OFFICE
CERTIFICATE OF CORRECTION

PATENT NO. : 5,338,595

DATED : August 16, 1994

INVENTOR(S) : Wu-Shyong Li

It is certified that error appears in the above-identified patent and that said Letters Patent is hereby corrected as shown below:

In Column 5, Line 48, the word "metalazo" should read --metal azo--.

In Column 9, Line 56, the word "tad" should read --rad--.

Signed and Sealed this

Twenty-third Day of May, 1995

Attest:

BRUCE LEHMAN

*Attesting Officer*  Commissioner of Patents and Trademarks